United States Patent

Wilcox

[15] 3,683,351
[45] Aug. 8, 1972

[54] PRESENCE DETECTOR

[72] Inventor: Merton F. Wilcox, 3135 N. Washington Blvd., Sarasota, Fla. 33580

[22] Filed: Jan. 7, 1970

[21] Appl. No.: 1,231

[52] U.S. Cl. ..........................340/258 C, 340/258 A
[51] Int. Cl. ..............................................G08b 13/00
[58] Field of Search..............340/258 C, 38 L, 258 A

[56] References Cited

UNITED STATES PATENTS

| | | | |
|---|---|---|---|
| 3,222,664 | 12/1965 | Premack.....................340/258 |
| 3,355,658 | 11/1967 | Gardiner ..........340/38 L UX |
| 3,500,310 | 3/1970 | Marcinkiewicz............340/38 |
| 3,397,364 | 8/1968 | Crandall..................340/38 X |
| 3,164,802 | 1/1965 | Kleist et al......................340/38 |
| 3,436,725 | 4/1969 | Spofford et al. .......340/258 X |
| 3,266,028 | 8/1966 | Taylor et al. ..............340/258 |
| 3,260,991 | 7/1966 | Laakman...............340/258 A |

*Primary Examiner*—John W. Caldwell
*Assistant Examiner*—Michael Slobasky
*Attorney*—George H. Baldwin and Arthur G. Yeager

[57] ABSTRACT

An electronic system for detecting the presence of an external object in the field of one of the reactors in the tank circuit of the first one of a pair of oscillators. The oscillators are interconnected for frequency synchronization. The tank circuits of the oscillators are tuned to have different natural resonant frequencies in the absence of an object whereby the oscillator signals differ in phase. The presence of an object affects the tuned resonant frequency of the tank circuit of the first oscillator in a direction or sense to decrease the phase difference between the oscillator output signals. The oscillator output signals are limited, fed to a phase detector, and a signal is developed representing the phase differential. When this signal decreases below a predetermined threshold, an output indicator is triggered to provide an indication of the presence of the external object. The threshold is established in part by a capacitor having a charge representing ambient conditions when no object is present. The charging circuit for the capacitor provides a short time constant to follow gradually changing ambient conditions but provides a long time constant to prevent change in the charge on the capacitor as the result of the relatively more rapid and large change in the impedance of the reactance element as an external object arrives within the detection field. The long time constant circuit is operative regeneratively to change the charge on the capacitor after a long delay following the detection of an arriving object in case the object has not in the interim departed from the field. The departure of the object from the field prior to the time that the charge has leaked from the memory capacitor, returns the capacitor charge to ambient condition. The system is particularly adapted to indicate presence of vehicles within the field of a loop disposed slightly below the surface of a roadway or driveway.

5 Claims, 2 Drawing Figures

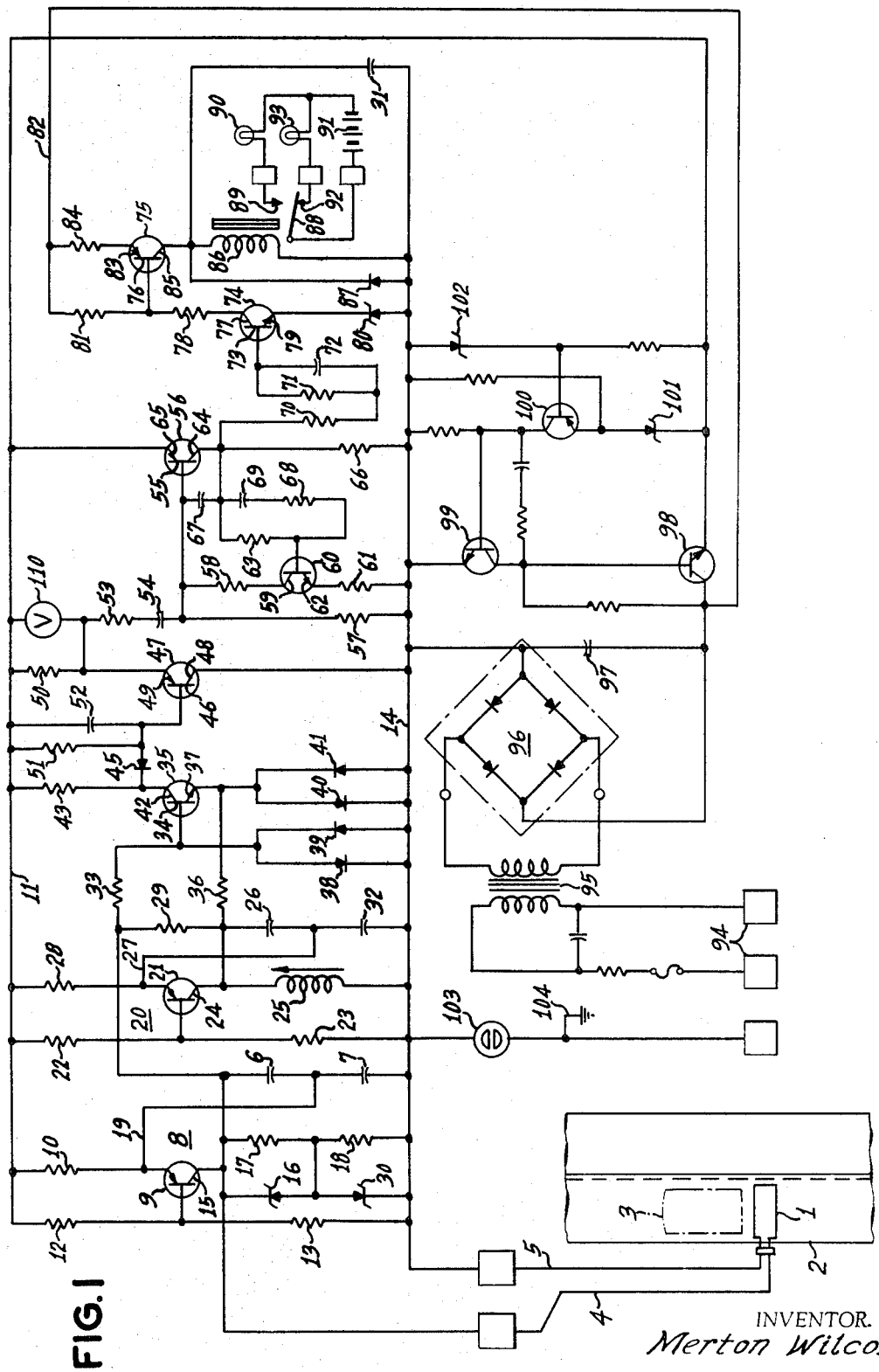

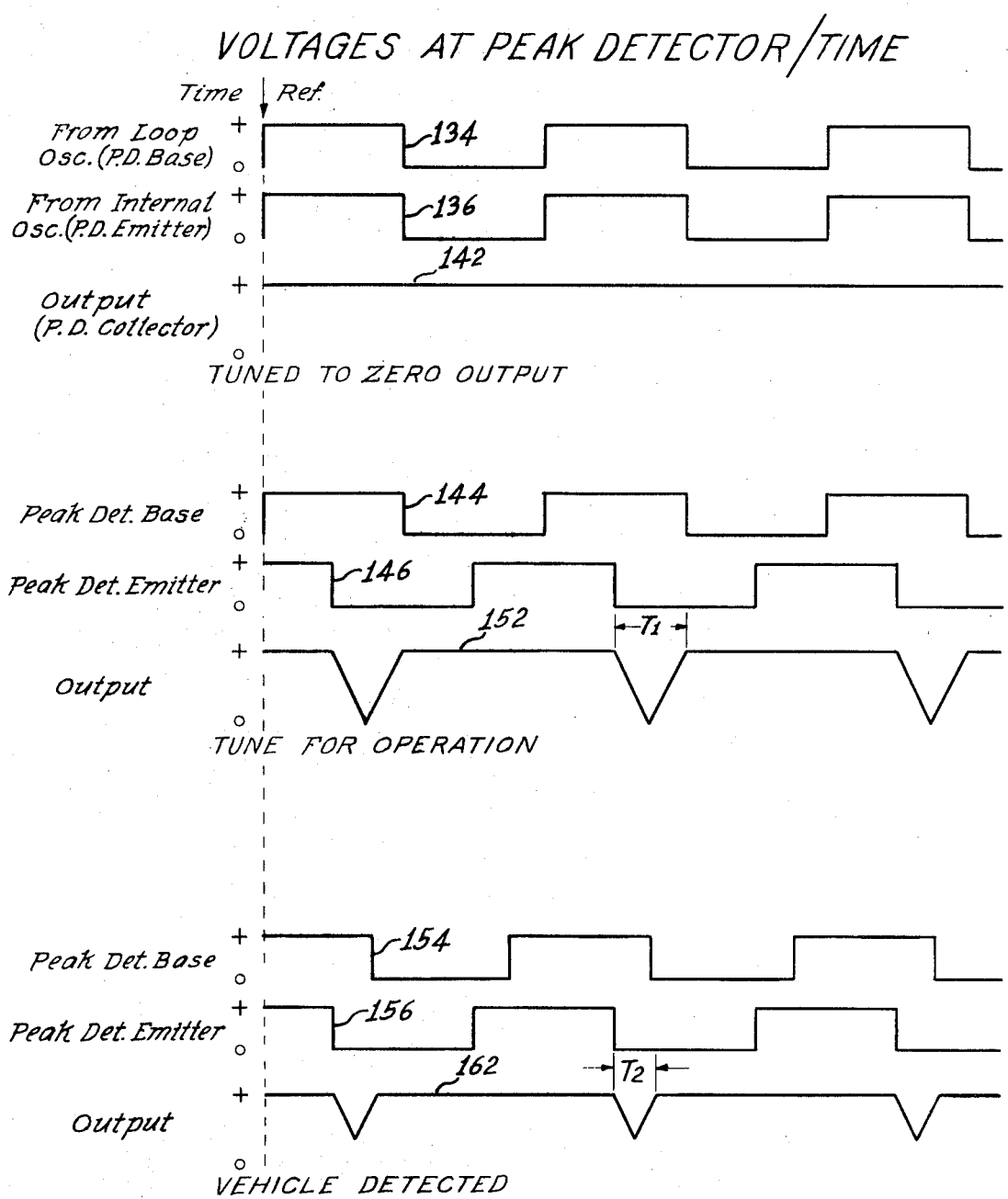

PRESENCE DETECTOR

This invention relates to detectors responsive to the presence of an object in the field of a reactance element. Objects having electrical or magnetic characteristics such that the impedance of the reactance element is affected by the presence of the object in the field are detected in accord with the invention. While the invention has utility for detecting various types of objects, it is particularly useful in detecting the presence of paramagnetic or conductive objects, such as vehicles, which arrive within the field of a detecting loop disposed typically an inch or two below the surface of a roadway or driveway or the like, and the system specifically illustrated and described herein is particularly adapted for detecting and indicating the presence of automobiles, bicycles and other vehicles within the field of such loop.

The system described herein embodies two oscillators tuned to different resonant frequencies but so interconnected as to remain in frequency synchronization. The detecting loop is incorporated in the tank circuit of one of the oscillators which is tuned to resonance at a lower frequency than that of the other oscillator. The signals from the two oscillators are applied to a phase detector. The presence of an automobile tunes the loop circuit to a higher frequency than that at which it resonates in the absence of the automobile, and the phase difference between the signals is reduced, changing the phase detector output. The phase detector output is measured against the charge on a memory capacitor, and, upon an abrupt change in such output, an indicator is actuated. The memory capacitor charge is caused continuously to represent ambient conditions in the system, which may change slowly with change in temperature of the loop, for example.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

FIG. 1 is a circuit diagram of a detector system embodying the invention, and

FIG. 2 is a set of voltage curves illustrating the tuning and operation of the systems.

In FIG. 1, the detector system is shown as comprising a buried loop 1 in a vehicle traffic lane 2, positioned to detect the presence of an external object in the form of vehicle 3 which may pass into or be present within the field of the reactance element in the form of an inductance loop 1. In this environment, the loop 1 may comprise two turns in a configuration extending four feet along and nine feet across the vehicle traffic lane and connected by 50-foot leads 4 and 5 to the detector circuit which is, accordingly, conveniently located remote from the position of the buried loop. While the loop is represented as a rectangular loop with long legs extending perpendicularly across the lane and short legs parallel thereto, other shapes ad forms of loops may be employed, which may be circular or oval, or in the shape of parallelograms, triangles or other geometric configurations, with legs which extend perpendicularly or diagonally with respect to the direction of vehicle travel. Reactance element 1 is connected in parallel with reactance elements 6 and 7 which are connected in series. Elements 6 and 7 in the circuit shown comprise capacitors constituting with inductance loop 1 a frequency determining circuit of an oscillator generally identified by the numeral 8. The circuit of inductance loop 1 and capacitors 6 and 7 comprises a tank circuit. The oscillator includes a PNP-transistor 9 having its emitter connected through resistor 10, which may be 470 ohms, to positive bus 11, and with its base connected to the juncture of voltage divider resistors 12 and 13 which are connected in series from positive bus 11 to negative bus 14. Resistor 12 connected between the base and the positive bus may be of 10K ohms while resistor 13 connected from the base to the negative bus may have a resistance of 3.3K ohms. One of the leads 4 from the loop 1 is connected to collector 15 of transistor 9 while the other lead 5 is connected to the negative bus. A network comprising comprising Zener diodes 16 and 30, each of which may be of type 1N757, and resistors 17 and 18, each of 0.1 megohm, is connected between the negative bus and the collector of transistor 9. The cathodes of the diodes are interconnected and connected to the juncture of the serially connected resistors 17 and 18, while one resistor is connected at its free end to the collector 15 and the other resistor 18 is connected at its free end to the negative bus. The anode of one diode is connected to the collector 15 and the anode of the other to the negative bus.

Oscillator 8 is arranged as a Colpitts oscillator, with the emitter of transistor 9 connected by a lead 19 to the midpoint or juncture of capacitors 6 and 7, each of which may be 0.1 mfd.

A second Colpitts oscillator is identified at 20 and comprises a transistor 21 which, like transistor 9, may be of type 2N3906. The base of transistor 20 is connected to the juncture of resistors 22 and 23 which are connected in series from the positive to the negative bus. These resistors correspond respectively to resistors 12 and 13 of oscillator 8 and may be of the same respective resistance values. The circuit for collector 24 of transistor 21 comprises a variable inductance 25 connected between the collector and the negative bus and connected in parallel with series connected capacitors 26 and 32 to form a tank circuit. Capacitors 26 and 32, like capacitors 6 and 7, may be of 0.1 mfd., and the mid-point between these capacitors is connected by lead 27 to the emitter of transistor 21. The emitter is further connected through a 1,000 ohm resistor 28 to the positive bus. The oscillators are coupled by a coupling impedance in the form of a common load resistor 29, which may be of 470 ohms, and which is connected between collectors 15 and 24. The resistor 29 constitutes a drive means interconnecting the oscillators and locking the oscillators into frequency synchronization.

The tank circuits of the respective oscillators when the system is operative and balanced for appropriate operation are tuned to natural resonant frequencies which are slightly different.

The output signal from oscillator 8 appearing on collector 15 and on the respective end of resistor 29 connected thereto is fed through resistor 33, which may be of 1,000 ohms, to the base 34 of phase detector transistor 35, while the output signal from oscillator 20, appearing on collector 24 and at the opposite end of resistor 29, is supplied through resistor 36, which may be of 100 ohms, to the emitter 37 of transistor 35. Transistor 35 is of the NPN-type 2N3904.

Reverse connected diodes 38 and 39 are connected between the negative bus and base 34 of transistor 35, while identical reverse connected diodes 40 and 41 are in the same manner connected between the emitter 37 and the negative bus. These diodes act as clippers or limiters whereby the respective signals applied to the base and emitter of the transistor 35 are square waves of identical amplitudes.

The collector 42 of transistor 35 is connected through load resistor 43 to the positive bus and to anode 44 of diode 45. The diode is connected to provide negative going pulses to the base 46 of transistor 47, of which the collector 48 is directly connected to the negative bus and the emitter 49 is connected through resistor 50 to the positive bus.

Connected between the base 46 and the positive bus is a 0.1 megohm resistor 51 bypassed by a 0.1 mfd. capacitor 52. Each of diodes 38, 39, 40, 41 and 45 is of type 1N914.

The signal appearing on emitter 49 of transistor 47 is applied through a 100-ohm resistor 53 to a large memory capacitor 54 of 1,000 mfd. Capacitor 54 is connected between resistor 53 and the base 55 of a transistor 56, while a resistor 57 is connected between base 55 and the negative bus. The value of resistor 57 determines the discharge time constant for capacitor 54. Thus, if an object arrives over the loop and is detected but then does not leave and remains over the loop, the charge on capacitor 54 leaks through resistor 57 at a rate determined by the value of the resistor until the potential across the resistor is reduced to a value at which the presence signal disappears. A typical value for resistor 57 is 10 meg and, if capacitor 54 has a capacity of 1,000 mfd., the signal would disappear approximately 30 minutes after an object 3 had arrived over loop 1 if the object then remained over the loop. If it is desired that the signal should disappear in a shorter time, the value of resistor 57 may be made less, as for example, 1 megohm, providing a much shorter period for a presence signal.

An additional connection to the negative bus is provided for base 55 through 330K ohm resistor 57, collector 49 and emitter 62 of transistor 60 and from emitter 62 through a 10K ohm resistor 61, all in series.

This circuit, which parallels resistor 57, provides, when transistor 60 is conductive, a shorter time constant for capacitor 54 than does the resistor 57 alone. The base of transistor 60 is connected through 0.47 megohm resistor 63 to the collector 64 of transistor 56. The emitter 65 of transistor 56 is directly connected to the positive bus. Transistor 56 under ambient conditions, in the absence of an object in the field of loop 1, is in saturation, base current being supplied through resistor 57 and through the collector emitter circuit of transistor 60. Transistor 60 is, under ambient conditions, maintained in saturation by the positive voltage on collector 64 as developed across collector resistor 66. A small capacitor 67 of 1,000 pf is connected from base to collector of transistor 56, while resistor 63 is bypassed by a 10K ohm resistor 68 and 8 mfd. capacitor 69 connected in series. Resistor 66 is typically of 18K ohms.

The collector 64 of transistor 56 is connected through resistor 70 of 10K ohms and through resistor 71 of 0.47 megohms bypassed by 8 mfd. capacitor 72 to the base 73 of transistor 74. Transistors 60 and 74 are NPN-type 2N3904, while transistors 47 and 56 are PNP-type 2N3906 as is transistor 75. The base 76 of transistor 75 is connected to the collector 77 of transistor 74K through resistor 78 of 3.3K ohms. The emitter 79 of transistor 74 is connected through Zener diode 80 to the negative bus, this diode being of type 1N703 and providing a constant emitter voltage of 3.1 volts with respect to the negative bus. Resistor 81 of 27K ohms connects the juncture of resistor 78 and base 76 to a positive voltage supply line 82 normally maintained at substantially 30 volts positive with respect to the negative bus, and the emitter 83 is connected to the voltage supply line through a 100 ohm resistor 84. The collector 85 of transistor 75 is connected through relay coil 86 to the negative bus, the relay coil being bypassed by a diode 87, also of type 1N914.

The voltage drops in high impedance resistors 63 and 71 are such that, while large signals received on base 55 of transistor 56, such as signals generated in response to presence of an automobile over loop 1, are sufficient to cut off transistors 60 and 74, small signals generated in response to arrival of a bicycle over the loop, for example, would be insufficient to cause such cut off were these resistors the only connection to the bases of transistors 60 and 74. Low impedance capacitor 69 bypassing resistor 63, however, causes transistor 60 to cut off momentarily when a small signal is applied through capacitor 54, such as in response to the arrival of a bicycle over the loop, and low impedance capacitor 72 applies such a signal to cut off transistor 74, thereby providing a momentary actuation of relay 86, 88.

A larger signal, corresponding to presence of an automobile, is sufficient, as previously described, to hold transistors 60 and 74 in non-conductive condition until the automobile leaves the vicinity of the loop or until the signal leaks from capacitor 54 through resistor 57, whichever first occurs. It will be understood that the signal applied to capacitor 54 when an automobile leaves the loop vicinity is of opposite polarity to that applied when an automobile arrives at the loop, and that such signal applied upon such leaving of the vicinity causes transistors 56 and 60 to become, or to remain, conductive.

Transistor 56 is, under ambient conditions, saturated, and the positive voltage which exists on its collector during ambient conditions maintains transistor 60, and thus transistor 74 and transistor 75, in saturation. Under these conditions relay coil 86, which is preferably bypassed by an 8 mfd. capacitor 31, carries current, holding in relay armature 88, that is, with the armature in contact with switch terminal 89. With the relay thus energized, a circuit is completed through any desired indicator means, such as indicator lamp 90 connected in series with the battery or other power source 91. Drop out of the relay causes armature 88 to drop into contact with terminal 92, opening the circuit through output indicator 90 and energizing output indicator 93. It will be understood that the indicator means 90 and 93 are exemplary only and that the relay 86, 88, 89, 92 may be employed to operate counting mechanisms, recording mechanisms, traffic control equipments, ticket spitters, or other known devices which it may be desired to operate in response to the presence or absence of a vehicle or other object at the loop location. Any of such devices are intended to be included within the meaning of the term "indicator" as used herein.

Power is supplied for the unit from a suitable alternating current source 94 through transformer 95 and full wave diode rectifier 96 developing approximately 30 volts d.c. across capacitor 97 for supplying this positive potential to line 82. The collector-emitter circuit of voltage regulating transistor 98 is connected in series to the positive bus 11 to provide regulated 20 volts d.c. potential thereto. Transistor 98 is controlled in a known manner by transistors 99 and 100 in response to variations from 20 volts as detected by Zener diodes 101 and 102. It is found preferable that the negative bus be not directly connected to an external ground and, accordingly, a small NE2 neon lamp 103 is shown as connected from the negative bus to an external ground 104.

The arrangement as shown and described herein is particularly useful to indicate the absence or presence of automobiles as external objects over a buried, or if desired, a ground level loop 1, and in a typical case a passenger car, with a 4 foot by 9 foot two-turn loop with 50-foot leads 4 and 5 will provide a 3-volt change in the voltage developed across resistor 50, while a smaller object such as a bicycle crossing such a loop may produce a change under these conditions of somewhat less than 1 volt.

The arrangement is tuned for proper operation by adjusting variable inductance 25 to tune the tank circuits of oscillators 8 and 20 to have the same natural resonant frequency. A representative satisfactory frequency is 50 kilocycles. Should it be found necessary a small additional capacitance may be connected across the loop terminals to reduce the resonant frequency of oscillator 8 or across the terminals of coil 25 to reduce the resonant frequency of oscillator 20. With reference to FIG. 2 of the drawings, when the tank circuits are so adjusted to have the same resonant frequencies, the result is that in-phase signals of equal amplitudes are applied to the base 34 and emitter 36 of peak detector transistor 35, as represented, respectively, by curves 134 and 136 in the portion of FIG. 2 identified by the legend "Tuned to Zero Output." The resultant voltage appearing on the collector 42 of the peak detector is represented as the constant voltage of curve 142. Under these conditions the voltage appearing across resistor 50 in the emitter circuit of transistor 47 will be zero volts. It will be understood that the curve 134 represents the output of oscillator 8, identified in FIG. 2 as the loop oscillator, while the curve 136 represents the voltage output from oscillator 20, identified as the internal oscillator. A voltmeter shown at 110 in FIG. 1 is conveniently connected across resistor 50, either permanently, or temporarily during the tuning of the system, and the voltage thereon will be zero with the in phase condition of the oscillators.

Starting with the tank circuits tuned to the same natural resonant frequency, the inductance of coil 25 is next adjusted to increase the natural resonant frequency of the tank circuit of internal oscillator 20 to provide a predetermined voltage across resistor 50, which may be read on voltmeter 110. In a typical system properly tuned and adjusted, this voltage will be 10 volts. Since the oscillators 8 and 20 drive each other into synchronization through the common load or coupling resistor 29, the result of such tuning of the tank circuit of oscillator 20 is to cause the output signal therefrom as applied to the emitter of transistor 35 to be advanced in phase with respect to the phase of the voltage from the loop oscillator, as applied to base 34. During the period that the base 34 is positive, curve 144, with respect to the emitter, as represented by curve 146 in the section of FIG. 2 titled "Tuned for Operation," that is, for the time T1, the output voltage at collector 42 becomes less positive. These recurring less positive pips establish a potential across storage capacitor 54 representing the ambient condition.

As heretofore pointed out, the tank circuit of the internal oscillator 20 is adjusted to have a resonant frequency higher than the frequency of the loop oscillator 8 in the absence of an external object over the loop. An external object in the presence of the loop tends to reduce the inductance thereof and thereby increase the resonant frequency of the tank circuit of the loop oscillator. The oscillators are so inter-connected that they drive each other to be and remain locked in synchronization as to frequency but the phase of the loop oscillator signal lags that of the internal oscillator. Accordingly, the base of transistor 35 is positive with respect to its emitter for time T1 as shown in FIG. 2. With the device properly tuned in the absence of an object over the loop the integrated voltage across resistor 50 is typically 10 volts.

The signals corresponding to the presence of an automobile are shown in the curves over the legend "-Vehicle Detected" in FIG. 2. The loop oscillator signal 154 has decreased in phase difference with respect to the internal oscillator signal 156 and now the base of transistor 35 is positive with respect to the emitter for the shorter time T2, and the integrated voltage produced across resistor 50 is lower, and typically approximately 7 volts, whereby a reverse bias is applied is applied to the base of transistor 56 through capacitor 54, cuts off transistor 56, thereby reducing the potential on collector 64, resulting in a reduction in the voltage on the base of transistor 60 and on the base of transistor 74, causing these transistors also to cut off. The charge on the memory capacitor 54 can only leak off through leak resistor 57. Under these conditions, the capacitor 54 may discharge within about 30 minutes sufficiently to cause transistor 56 to begin to conduct. Immediately the potential of collector 64 begins to rise increasing the potential on the base of transistor 60 which, also, begins to conduct further increasing the potential on the base of transistor 56. Transistors 60 and 56, accordingly, regeneratively become fully conductive, and the increased potential of the collector of transistor 56 causes transistors 74 and 75 to become conductive. It will be apparent that the length of time after the vehicle has arrived over the loop, and after the voltage across resistor 50 has been reduced, during which transistor 56 remains reverse biased is dependent upon the value of resistor 57 and, of course, upon the value of the memory capacitor 54. At any time that the external object removes from the location of the loop 1, the tuning of the tank circuit of oscillator 8 is affected to reestablish the conditions represented by the "Tuned for Operation" curves, with the voltage across resistor 50 re-established at 10 volts. The signal applied to capacitor 54 upon leaving of a vehicle is in the direction to tend to increase conductivity of transistors 56 and 60, whereby the charge on capacitor 54 is quickly re-established in accord with the ambient inductance of loop 1.

Gradual changes which may occur in the inductance of loop 1, as a result of changing temperatures or the occurrence of rain, do not occur with sufficient rapidity to cut off transistors 56 and 60, whereby the charge on capacitor 54 continuously adjusts to the ambient conditions through the short time constant circuit through resistors 58 and 61 and the collector-emitter circuit of transistor 60.

I claim:

1. In an electronic presence detector including first and second oscillators, means maintaining said oscillators in frequency synchronization, said oscillators being tuned to slightly different frequencies thereby to provide output signals out of phase with each other, means responsive to the presence of an external object to change the phase difference between the output signals of said oscillators, means to limit the amplitudes of said output signals, a phase detector connected to receive said limited output signals, and indicator means responsive to the output of said phase detector, characterized in that said phase detector comprises a transistor having one said output signal applied to its base and the other to its emitter and having its collector connected to a load impedance, said indicator means being operatively connected to respond to the signal voltage on said collector.

2. In an electronic presence detector including first and second oscillators operating at the same predetermined frequency, means responsive to the presence of an external object to advance or retard the phase of the output signal of one of said oscillators with respect to the phase of the output signal of the other of said oscillators, means to limit the amplitudes of said output signals, a phase detector connected to receive said limited output signals, and indicator means responsive to the output of said phase detector, characterized in that said phase detector comprises a transistor having one of said oscillator output signals applied to its base and the other of said oscillator output signals applied to its emitter and having its collector connected to a load impedance, said indicator means being operatively connected to respond to the signal voltage on said collector.

3. The combination according to claim 2 wherein the maximum phase difference between said oscillator output signals is less than 90 degrees.

4. The combination according to claim 3 wherein said oscillators are tuned to different frequencies in the absence of an external object and are provided with feedback means responsive to the phase difference between the respective output signals thereof to maintain frequency synchronization of said oscillators.

5. An electronic presence detector comprising an inductance loop disposed at a location at which presence of an external object is to be detected, oscillator and detector means including said loop providing an output signal of which the voltage amplitude is responsive to the inductance of said loop and decreases in response to increase of said inductance, a memory capacitor, low impedance means to charge said capacitor to the voltage of said signal, a high resistance leak resistor for said capacitor establishing a long time constant direct current discharge circuit therefor, a second direct current discharge circuit for said capacitor comprising impedance means and a first current control device having a control electrode, the impedance of said second discharge circuit being controlled by the potential on said electrode between a maximum impedance greater than and a minimum impedance less than the impedance of said resistor, a second current control device provided with self-biasing means and having a control electrode connected through said memory capacitor to said charging means, said second current control device being driven to cut off in response to abrupt reduction of said signal voltage, means connecting said control electrode of said first current control device to said biasing means to cut off said first current control device in response to cut off of said second current control device, said current control devices being normally conductive, whereby said memory capacitor has a short time constant and its charge follows said voltage through changes in the inductance of said loop occurring gradually as a result of ambient temperature changes, but has a long discharge time constant and its charge does not follow said voltage through abrupt decreases thereof resulting from rapid changes in said inductance occurring upon the arrival of an object at the loop location, and whereby, following a period of slow decay of the charge on said capacitor through said resistor initiating conduction of said second current control device, said control devices regeneratively resume fully conductive condition to thereby tune out said object and condition the detector to respond to further external objects, and indicating means responsive to the condition of one of said current control devices.

* * * * *